US011281367B2

(12) United States Patent
Nishioka et al.

(10) Patent No.: US 11,281,367 B2
(45) Date of Patent: *Mar. 22, 2022

(54) SLIDER FOR CONTENT SELECTION IN USER INTERFACE

(71) Applicant: SmartNews, Inc., Tokyo (JP)

(72) Inventors: Yuhei Nishioka, Foster City, CA (US); Jihee Kim, Brisbane, CA (US); Kazufumi Alfred Iwasaki, Berkeley, CA (US); Devon Larson Bancroft, Brooklyn, NY (US)

(73) Assignee: SmartNews, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,025

(22) Filed: Feb. 3, 2021

(65) Prior Publication Data

US 2021/0173553 A1 Jun. 10, 2021

Related U.S. Application Data

(63) Continuation of application No. 17/116,002, filed on Dec. 9, 2020.

(60) Provisional application No. 62/945,731, filed on Dec. 9, 2019.

(51) Int. Cl.
*G06F 3/0484* (2013.01)
*G06F 3/0483* (2013.01)
*G06F 3/0485* (2013.01)
*G06F 3/0488* (2013.01)
*G06F 3/04847* (2022.01)

(52) U.S. Cl.
CPC ........ *G06F 3/04847* (2013.01); *G06F 3/0483* (2013.01)

(58) Field of Classification Search
CPC ............... G06F 3/04847; G06F 3/0483; G06F 3/04855; G06F 3/04883
See application file for complete search history.

(56) References Cited

U.S. PATENT DOCUMENTS

| 2005/0033657 | A1 | 2/2005 | Herrington et al. | |
| 2011/0112903 | A1 | 5/2011 | Goldman et al. | |
| 2011/0153605 | A1* | 6/2011 | Silverman | G06F 16/58 707/737 |
| 2014/0195977 | A1* | 7/2014 | Chang | G06F 16/24578 715/833 |
| 2014/0365507 | A1* | 12/2014 | Wissner | G06F 16/24578 707/748 |

(Continued)

OTHER PUBLICATIONS

United States Office Action, U.S. Appl. No. 17/116,002, filed Sep. 1, 2021, 36 pages.

*Primary Examiner* — John T Repsher, III
(74) *Attorney, Agent, or Firm* — Fenwick & West LLP

(57) ABSTRACT

Embodiments relate to a user interface (UI) that displays a feed of content items to a user. The content items in the feed may include content related to a same or similar topic, such as content items related to a recent political event. The interface can include an interactive slider on a scale that permits the user to adjust the displayed content according to an attribute described by the scale. More specifically, content items are assigned an attribute value and the location of the slider modifies the selection process for content items so that content items having an attribute value corresponding to the location of the slider are selected and displayed in the feed.

21 Claims, 11 Drawing Sheets

(56) References Cited

U.S. PATENT DOCUMENTS

| | | | |
|---|---|---|---|
| 2015/0046423 A1* | 2/2015 | Weeks | G06F 16/957 |
| | | | 707/708 |
| 2015/0186491 A1 | 7/2015 | Zukerman et al. | |
| 2016/0357366 A1 | 12/2016 | Migos et al. | |
| 2018/0267951 A1* | 9/2018 | Moah | G06F 3/0482 |
| 2019/0082224 A1* | 3/2019 | Bradley | G06Q 30/0282 |
| 2019/0179861 A1* | 6/2019 | Goldenstein | G06F 16/9535 |

* cited by examiner

SLIDER FOR CONTENT SELECTION IN USER INTERFACE

CROSS-REFERENCE TO RELATED APPLICATIONS

This application is a continuation of U.S. patent application Ser. No. 17/116,002, filed Dec. 9, 2020, which claims the benefit of priority to U.S. Provisional Patent Application No. 62/945,731, 'Slider For Content Selection in a User Interface,' filed on Dec. 9, 2019, which are incorporated by reference in their entirety.

BACKGROUND

The present disclosure relates to user interfaces (UIs) that display feeds of content items to users.

People often search for and read articles to learn about a topic or to stay informed about current events. During this process, people typically review multiple articles until they find one or more articles that are suitable for reading completely. For example, if an article is too long, a person may search for shorter articles. In another example, if an article is too technically complex, a person may search for other articles that require less technical knowledge to understand. In addition, when automated systems automatically select content for users, these automated systems often use signals of prior content viewed or interacted with by the user or other characteristics known about the user to select a set of content for the user. One problem with this approach is, because of confirmation and other biases, users often select content familiar to or confirming of the user's prior information. Automatic content selection often enforces this tendency by selecting content similar to the content previously viewed by the user, and users may thus be presented with very similar content. For certain kinds of content, such as political news, this can mean that it may be difficult for an automatic content selection system to adequately select a mixture of content from a variety of viewpoints and a user may tend to view content from a single perspective, which becomes reinforced by the content selection systems.

SUMMARY

Embodiments relate to a user interface (UI) that displays a feed of content items to a user. The content items in the feed may include content related to a same or similar topic, such as content items related to a recent political event or a politician. The interface can include an interactive slider on a scale that permits the user to adjust the displayed content according to an attribute described by the scale. More specifically, content items are assigned an attribute value and the location of the slider modifies the selection process for content items so that content items having an attribute value corresponding to the location of the slider are selected and displayed in the feed. In an example embodiment, the content items are news articles and the assigned attribute values reflect political viewpoints of the news articles. Thus, in this example the location of the slider can indicate the political viewpoints of the displayed content items. By adjusting the slider, content items with a more conservative or liberal political viewpoint can be displayed. In other embodiments, the scale and location of the slider may relate to different kinds of attributes of interest to a user, which may be accounted for in various ways when the system selects content. For example, the attributes may be used as a filter, or may be weighed differently in the selection process. Thus, the slider allows the user to readily view a range of content items that span across an attribute range by modifying the position of the interactive slider along the scale.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

In the following description, numerous specific details are set forth to provide a more thorough understanding. However, specific examples may be practiced without one or more of these specific details. In other instances, well-known features have not been described in detail to avoid unnecessarily complicating the description.

In the figures, like reference numbers indicate identical or functionally similar elements. Also in the figures, the left most digits of each reference number corresponds to the figure in which the reference number is first used.

Figure 1:
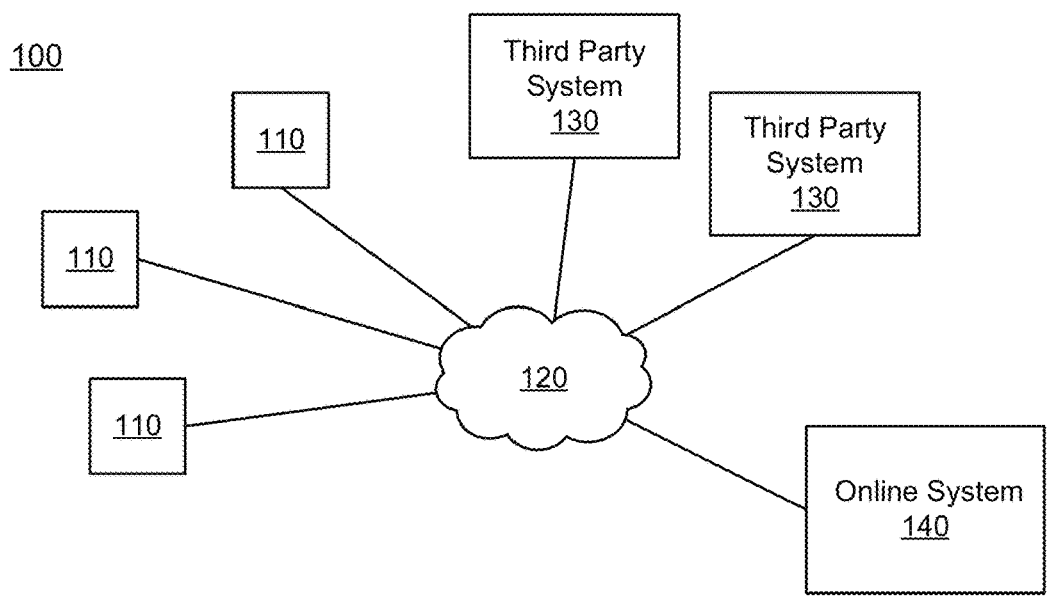
FIG. 1 is a block diagram of a system environment for an online system, according to an embodiment.

FIG. 1 is a block diagram of a system environment 100 for an online system 140, according to an embodiment. The system environment 100 comprises one or more client devices 110, a network 120, one or more third-party systems 130, and the online system 140. The online system 140 may be a news provider, a social networking system, a content sharing network, or any other system that provides content to users. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 (also referred to as content providers) may be coupled to the network 120 for communicating with the online system 140. A third-party system 130 can communicate information to the online system 140, such as advertisements and content. Example third party systems include content publishers such as newspaper publishers, news services, and magazine publishers.

Figure 2:
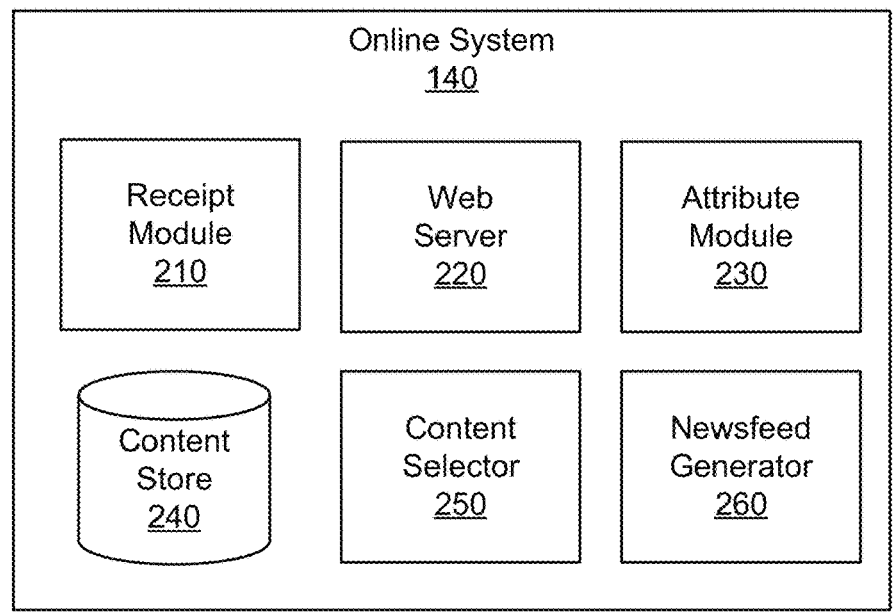
FIG. 2 is a block diagram of an architecture of the online system, according to an embodiment.

FIG. 2 is a block diagram of an architecture of the online system 140, according to an embodiment. The online system 140 includes modules such as a receipt module 210, a web server 220, an attribute module 230, a content store 240, a content selector 250, and a feed generator 260. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

The receipt module 210 receives (or retrieves) content items from third party systems 130 and may store them in the content store 240. Content items can represent various types of content. Examples of content represented by a content item include a news article, page post, a status update, an image, a video, a link, a shared content item, a gaming application achievement, a check-in event at a local business, a brand page, or any other type of content.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

The attribute module 230 analyzes content items in the content store 240 (or directly from the receipt module 210) and assigns attribute values to the content items for one or more attributes (also referred to as scoring the content items). In some embodiments, the attribute module 230 does not analyze every content item in the content store 240. For example, the attribute module 230 only analyzes a content item if it has a same or similar topic as one or more other content items. Said differently, the attribute module 230 may analyze a content item if it is in a set that includes a threshold number of content items (e.g., three) with a same or similar topic. Content items can be assigned an attribute value for each attribute. An attribute is a quality or characteristic of a content item describing an aspect of the content item. An attribute can thus refer to the content or quality of the content of a content item. Examples of attributes are article length, viewpoint, technical difficulty, and time since publication. The viewpoint attribute refers to the point of view or bias associated with the content item. Examples of viewpoints include political, religious, economic, age (e.g., of the author/creator or target consumer), gender, sentiment, and sexual orientation viewpoints. Sentiment refers to the tone or level of emotion in a content item (e.g., a content item describes a topic with a positive or negative tone). Viewpoints of a content items may, at least in part, be determined by analyzing words, phrases, and sentence structures of text within the content item. This may be referred to as sentiment analysis and may be performed by a machine learned algorithm.

An attribute value indicates the strength of the attribute exhibited by the content item. A content item may be assigned an attribute value within a range of attribute values (e.g., a value between 0-10). In these embodiments, a position of the slider on the scale is associated with a value or range of values. Alternatively or additionally, a content item may be assigned a tag, for example, that is associated with a position of the slider on the scale. The attribute module 230 may determine an attribute value based on the third party system 130 that provided the content item, the author(s) or creator(s), article length, phraseology, topic, content, types of content in the content item (e.g., text, image, video), and readability of the content (e.g., average sentence length). For the attribute of political viewpoint, attributes values of 0-3 may represent a conservative viewpoint, values of 4-7 may represent a centralist viewpoint, and values of 8-10 may represent a liberal viewpoint. Alternatively, content items can be directly assigned political viewpoint tags, such as "conservative," "centralist," or "liberal." For the attribute of article length, attribute tag values may be "long," "medium," or "short." For the attribute of technical difficulty, attribute tag values may be "none" (requiring no technical expertise to understand the article), "some," and "advanced" (requiring a high level of technical expertise to understand the article).

The content selector 250 selects content items in the content store 240 to be placed in the feed. The feed may include a limited number of content items or it may include a complete set of candidate content items. The number of content items included in a feed may be determined in part by the limited screen space of the user's client device 110. The content selector 250 selects and orders content items according to a set of selection criteria. Selection criteria can include topic, content, title, date of publication, author(s), source, popularity, relevance (e.g., to the user or to events currently or recently occurring), and number of available content item slots in the feed. The selection criteria may be determined by the receipt module 210, the attribute module 230, or another module.

Additionally or alternatively, the content selector 250 can select and order content items according to one or more user selections. For example, a user elects to view content items that are short in length (e.g., by selecting the position of the slider on the scale). In another example, a user elects to view content items with a conservative political viewpoint. Thus, the content selector 250 selects content items with attribute values that indicate a conservative political viewpoint. If a user changes their selection (e.g., by changing the position of the slider), then the client device may request an updated feed and the content selector can select new content items for the feed based on the new selection. If a user does not provide a selection, a default option is selected. In some embodiments, the user can select the attribute in addition to the attribute value. For example, instead of political viewpoint, the user selects article length as an attribute. In some embodiments, the user can provide an attribute value for two or more attributes. For example, a user selects to view content items with a conservative political viewpoint point and a Muslim religious viewpoint. Thus, the content selector 250 selects content items with political attribute values corresponding to conservative and religious attribute values corresponding to Muslim.

The content selector 250 may assign attribute values to slider positions on the scale. For each position on the slider, the content selector 250 may determine which attribute value or range of attribute values are associated with that position. In some cases, two or more attribute values or ranges of two or more attribute values are associated with a position on the scale. In an example embodiment, the content selector 250 determines that content items with attribute values ranging from 0-5 will be displayed when the slider is at the leftmost position on the scale, content items with attribute values ranging from 6-10 will be displayed when the slider is at the middle position on the scale, etc. Assigning attribute values to positions on the scale may be based on the range of possible attribute values for a given attribute, the availability of content items, the attribute values of available content items, and a desired number of slider positions on the scale. As previously described, other selection criteria may also affect which content items are displayed.

The content selector 250 may select content items in response to a request from a client device 110 for a user interface that includes a feed of content items. Alternatively, the selection process is predetermined. In these cases, the content selector 250 may select content items prior to receiving a request. For example, after content items are received by the online system 140, the content selector 250 groups the content items into sets or subset of content items to be displayed together in a feed.

In some embodiments, content items associated with a same or similar topic (or any other selection criterion) are grouped into a set by the content selector 250. The content selector 250 may then form subsets based on the attribute values of the content items in the set. For example, each subset includes content items with the same attribute values or with attribute values in a subrange of the range of attribute values. Since locations on the scale may represent attribute values or ranges or attribute values, each subset may be associated with a location on the scale so that, when the slider is at a location on the scale, the user interface displays a subset of content items with attribute values represented by the location on the scale.

The feed generator 260 generates a feed with the content items selected by the content selector 250. The feed generator 260 transmits the feed to a client device 110 (e.g., via the web server 220) to be generated as in a user interface.

The web server 220 links the online system 140 via the network 120 to the one or more client devices 110, as well as to the one or more third party systems 130. The web server 220 serves web pages, as well as other content, such as JAVA®, FLASH®, XML and so forth. The web server 220 may receive and route messages between the online system 140 and the client device 110, for example, instant messages, queued messages (e.g., email), text messages, short message service (SMS) messages, or messages sent using any other suitable messaging technique. A user may send a request to the web server 220 to upload information (e.g., images or videos) that are stored in the content store 210. Additionally, the web server 220 may provide application programming interface (API) functionality to send data directly to native client device operating systems, such as iOS®, ANDROID™, or BlackberryOS.

As previously indicated, in some embodiments, the content items are news articles and the location of the slider on the scale indicates the political viewpoint of the news articles. FIGS. 3-11 are described in the context of this use case. The example user interfaces shown in FIGS. 3-11 may be displayed by a client device 110 that communicates with the online system 140.

Figure 3:
FIG. 3 is a user interface (UI) that includes a feed of content items related to politics, according to an embodiment.

FIG. 3 is a user interface that includes a feed of content items related to politics, according to an embodiment. As indicated by the tabs 300 at the top of the interface, other types of topics can be displayed, such as lifestyle, U.S. news, Sports, and world news.

Each content item (e.g., content item 310A) in the feed is associated with a single news article. In the example of FIG. 3, the content items display the title of the associated article, a picture from the article, and the news source (e.g., third party system 130) who published the article. If a content item is selected by the user, the associated article may be consequently displayed to the user.

However, if a threshold number of news sources publish articles on a same or similar topic, instead of representing each of the articles as a content item (and possibly over filling the feed with similar content items), a single content item 310B may represent the group of articles (also referred to as a set of content items). Topics of the articles may be determined by analyzing the content of each article (e.g., text, images, video), for example using one or more machine learned algorithms. Content item 310B is indicated as representing multiple articles by the indicator 320A. In this example, the indicator states "NEWS FROM ALL SIDES See 9 articles." If the user selects content item 310B, one of the articles from the group may be displayed to the user. This is described with respect to FIG. 4. Alternatively, if the user selects the indicator 320A, a feed with one or more articles from the group may be presented to the user. For example, in response to a user selecting indicator 320A, the client device sends a request to the online system 140 for a user interface that includes a feed of one or more content items from the group. The user interface displayed to the user may include a slider and scale. This user interface is described with respect to FIGS. 5-9.

Figure 4:
FIG. 4 is a news article displayed on a client device, according to an embodiment.
Figure 5:
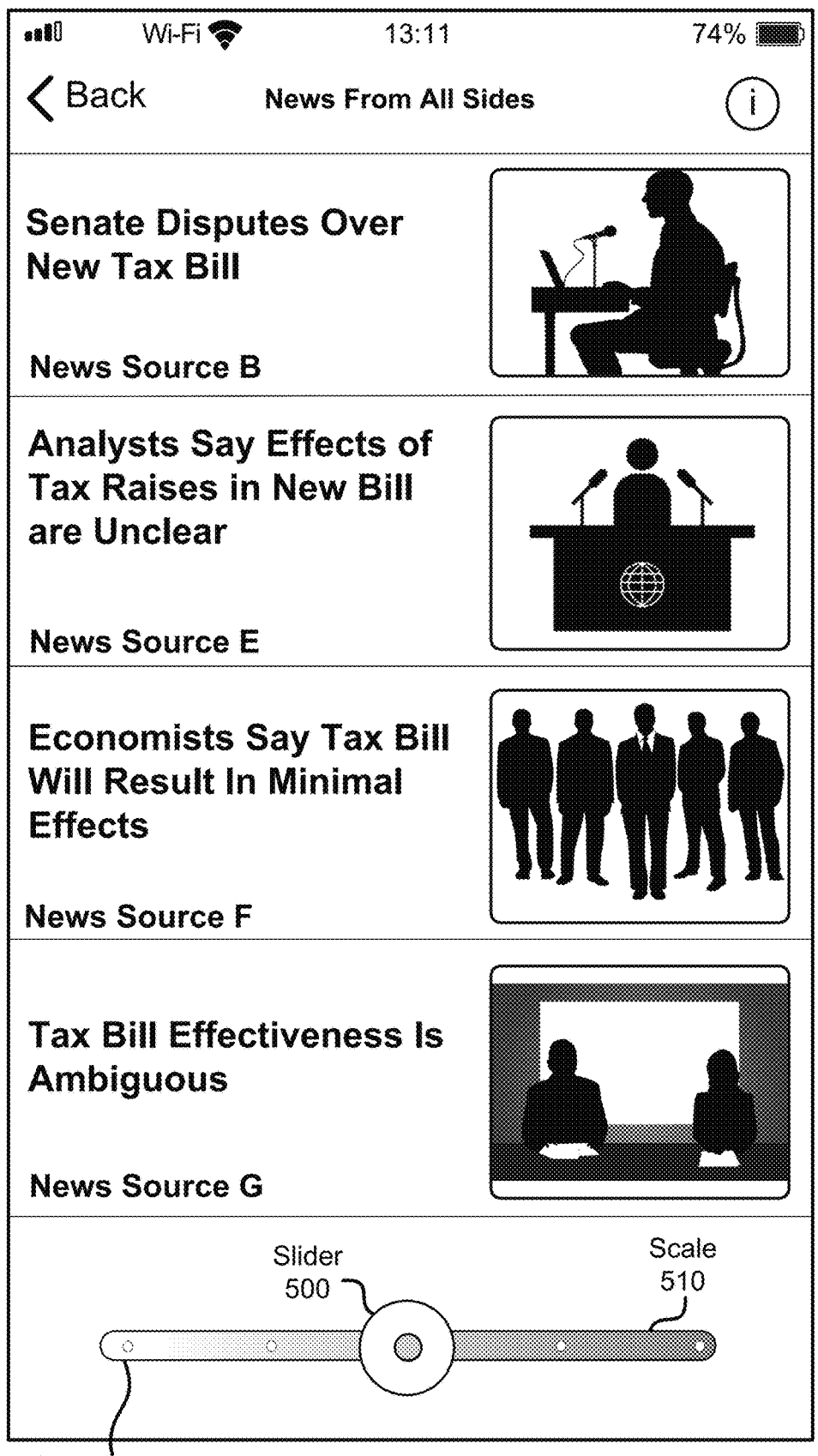
FIGS. 5-9 illustrate user interfaces with different feeds of content items related to a same or similar political topic, according to some embodiments.
Figure 6:
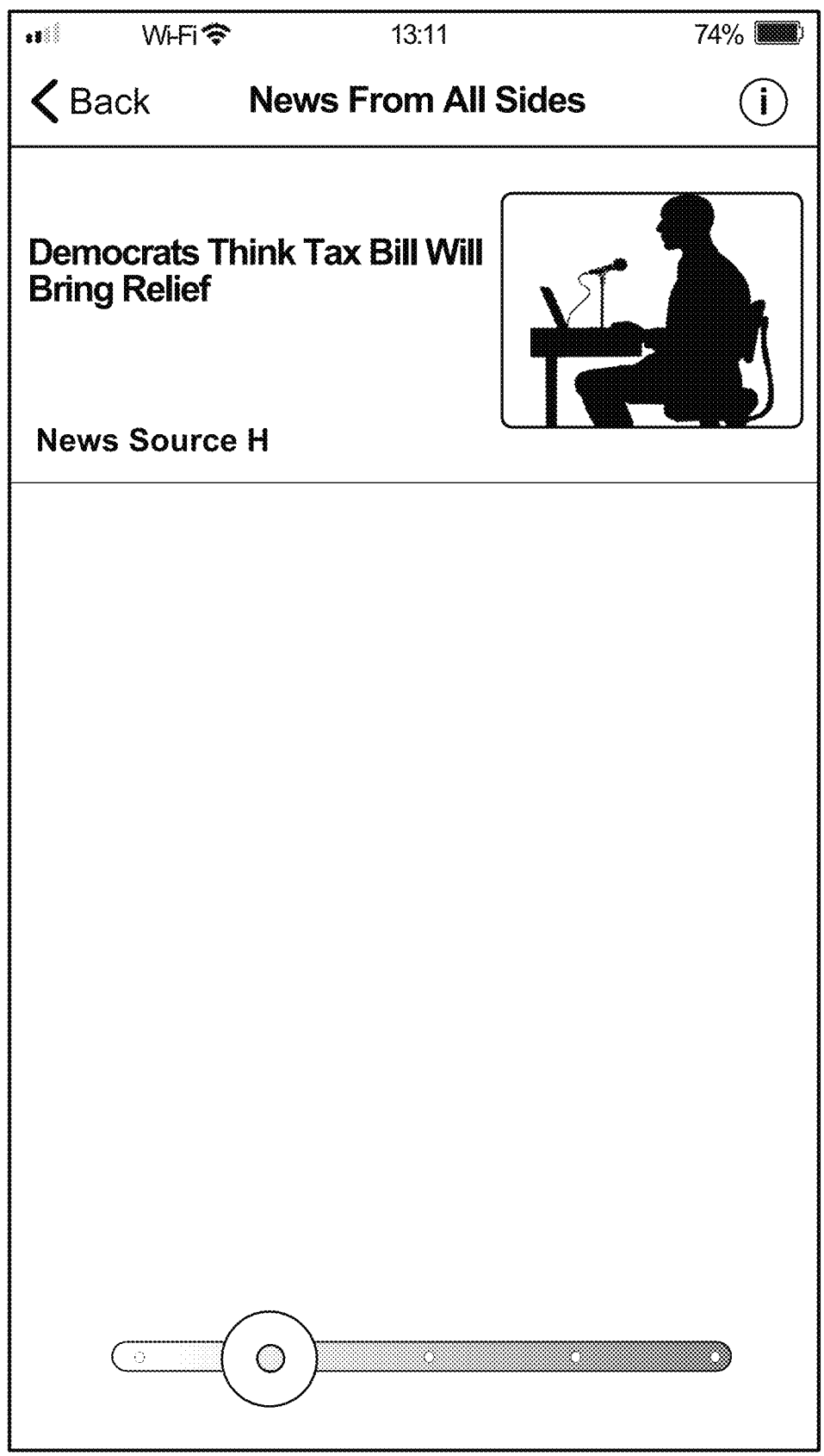
Figure 7:
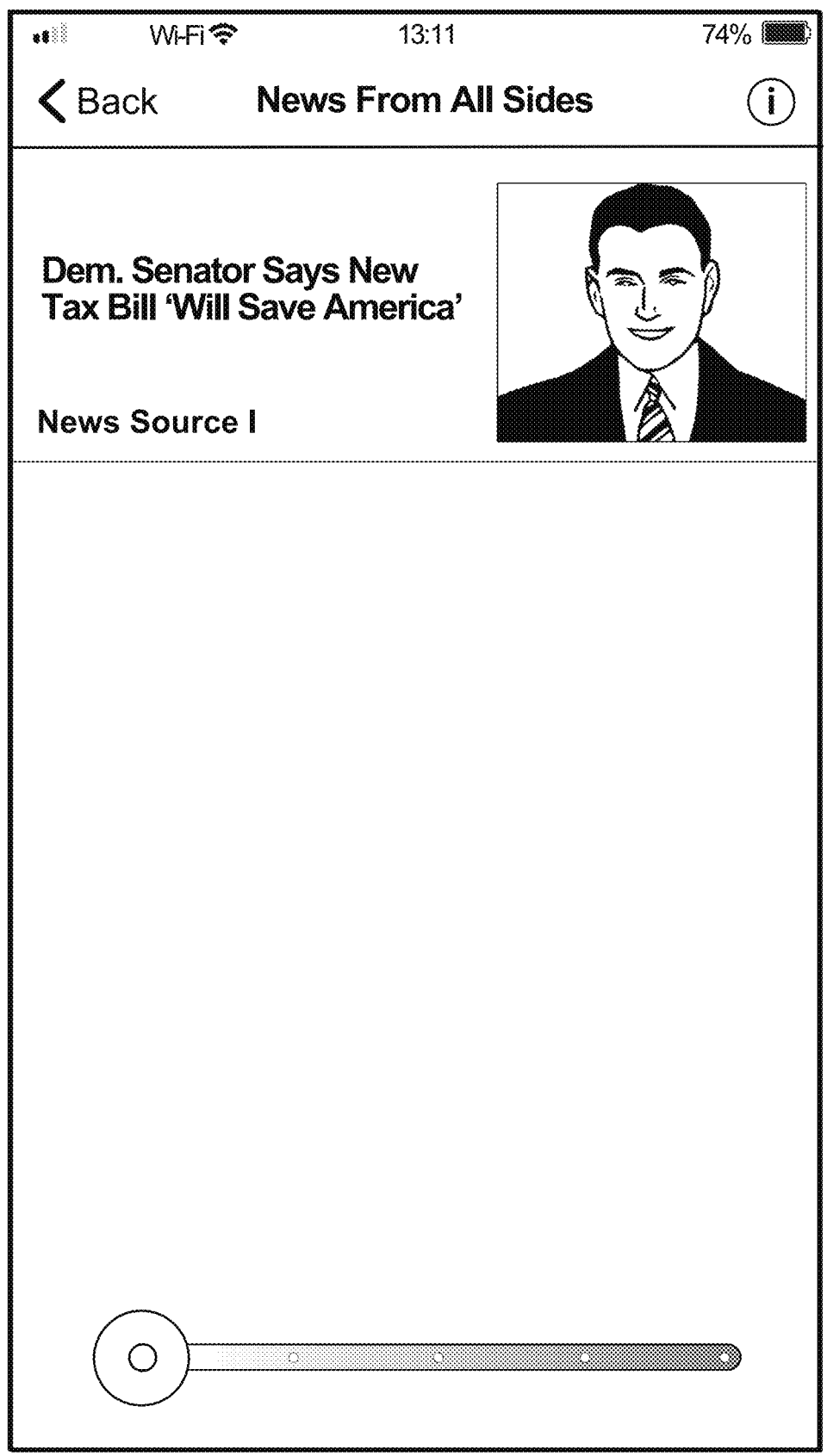
Figure 8:
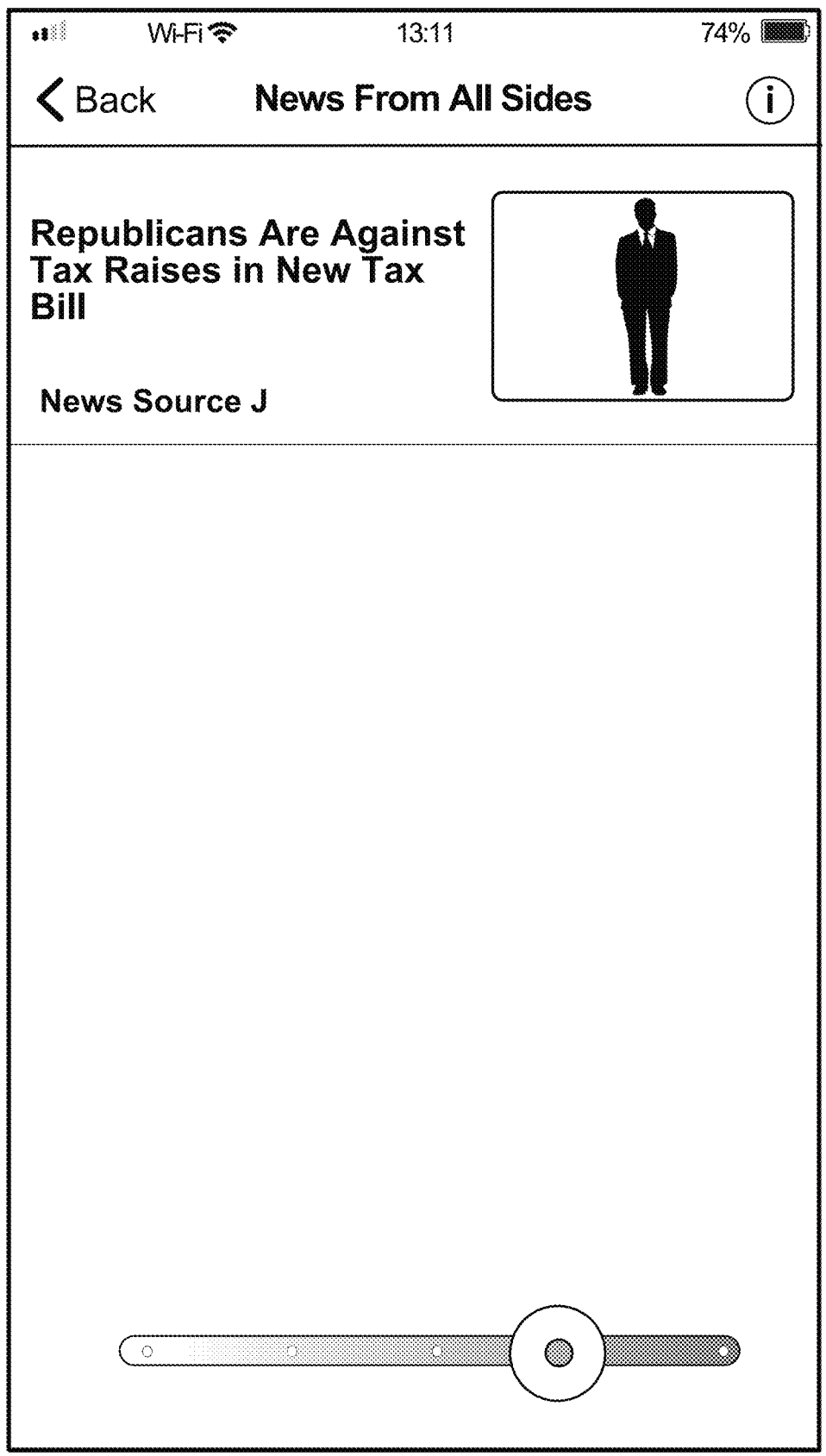
Figure 9:
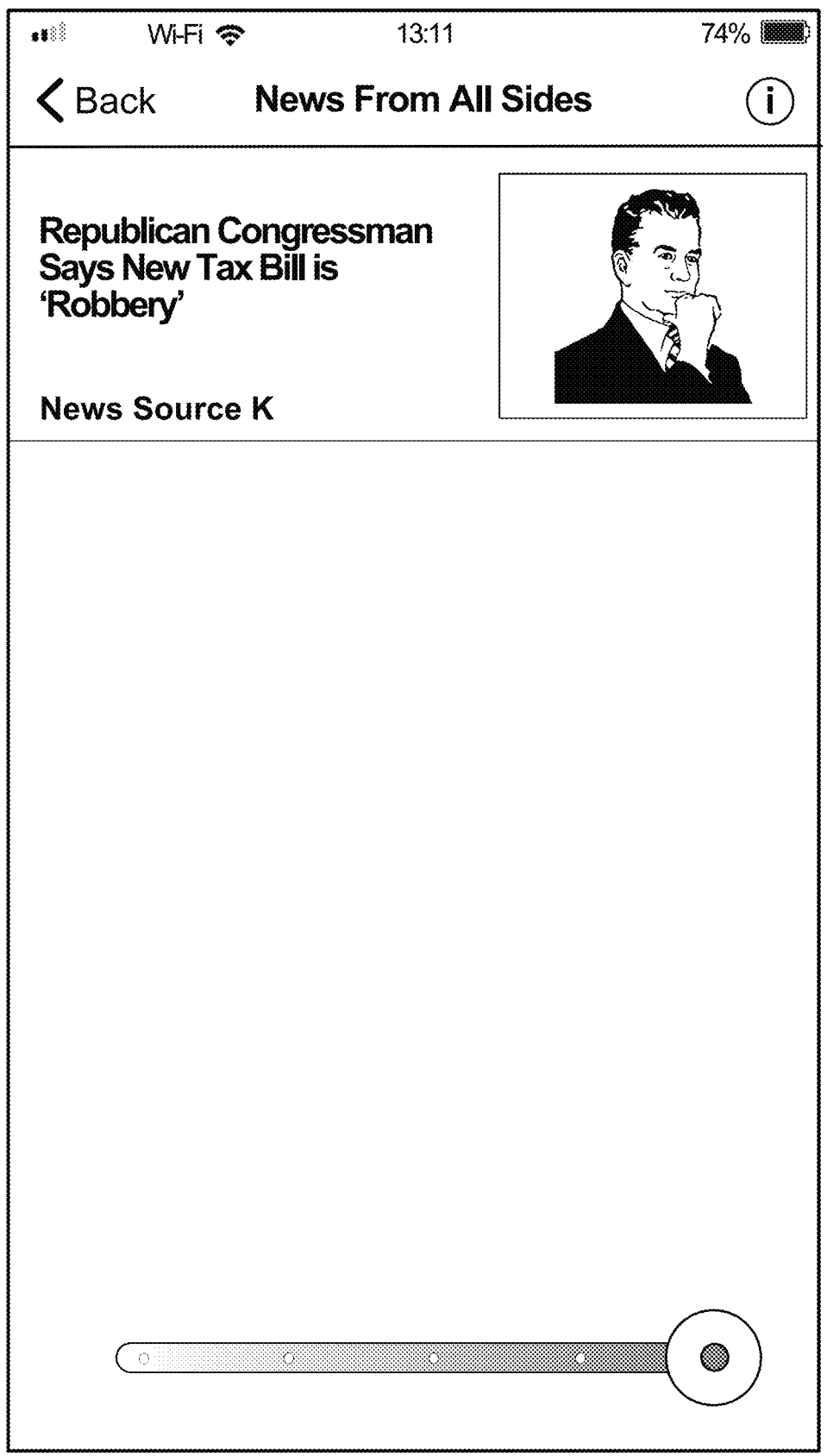

FIG. 4 is a news article displayed on a client device, according to an embodiment. Since the article is associated with a group of articles that cover a same or similar topic, the user interface includes indicator 320B similar to indicator 320A. As previously described, by selecting the indicator 320B, other articles in the group may be presented to the user in a feed.

FIGS. 5-9 illustrate user interfaces with different feeds of content items related to a same or similar political topic, according to some embodiments. In the example of FIGS. 5-9, the content items are related to a new tax bill. A single slider 500 and scale 510 are displayed in the user interface, however in some embodiments, multiple sliders and scales or a multidimensional slider can be displayed so that the user can control multiple attribute values. For example, the multidimensional slider for political viewpoint may be a Nolan Chart. The slider 500 and scale 510 may be replaced with other interactive controls, such as a knob, a scroll box, one or more buttons, etc. The slider 500 includes five stopping points 520 that indicate available positions for the slider 500 (e.g., the slider 500 snaps into one of the stopping points 520 when a user interacts with the slider 500). While the scale 510 has only five stopping points 520, additional or fewer stopping points may be present. For example, the slider 500 has so many stopping points 520 that the slider 500 appears to continuously slide along the scale 510. The number of stopping points 520 can depend on the number of available attribute values of the content items.

As previously discussed, the user can interact with the slider 500 by moving it to a different position along the scale 510. By moving the slider 500, the displayed content items change according to their political viewpoint attribute values. For example, if the slider 500 is in the middle of the scale, the content selector 250 selects content items so that the feed includes content items with attributes values of neutral or centralist political viewpoints. In some embodiments, the slider is in the middle position by default. If the user moves the slider 500 to the left (e.g., FIGS. 6 and 7), content items in the feed are replaced with content items associated with a liberal political viewpoint. The distance from the center position indicates the strength of the liberal political viewpoint of the content items selected and displayed in the feed. Thus, the content item in FIG. 7 has a stronger liberal viewpoint than the content item in FIG. 6. Similarly, if the user moves the slider 500 to the right (e.g., FIGS. 8 and 9) the feed is adjusted to include content items associated with a conservative political viewpoint. In this case, the distance from the center indicates the strength of the conservative political viewpoint. Thus, the content item in FIG. 9 has a stronger conservative viewpoint than the content item of FIG. 8. While only one content item is displayed in FIGS. 6-9, more or less content items may be displayed. The number of content items displayed can depend on the number of available content items with attribute values corresponding to that slider position.

The scale 510 may be colored to indicate attribute values of content items associated with positions on the scale 510. The scale 510 can also include color gradations to indicate changes in attribute values. For example, the left side of the scale 510 is blue to indicate content items with liberal viewpoints, the right side of the scale is red to indicate content items with conservative viewpoints, and the middle of the scale 510 is purple to indicate content items with neutral or centralist viewpoints. A colored scale 510 may help a user intuitively understand how the position of the slider 500 corresponds to the displayed content items.

In some embodiments, when a user interacts with the slider 500, the user interface displays an indicator (not illustrated) that indicates the position of the slider 500 on the scale 510. Since a user's finger may block the user's view of the slider 500 when they are interacting with the slider 500, the indicator may help the user determine the position of the slider on the scale 510.

As previously discussed, the political viewpoint (or any other attribute value) of the content items may be determined based on the source, author, phraseology, tone, or topic of the article. For example, if a third-party system 130 or author is commonly associated with a liberal political viewpoint, then content items from that third-party system 130 or author can be assigned attribute values that correspond with a liberal viewpoint.

In another use case example, the content items are articles relating to a technically advanced subject, such as machine learning or quantum computing. In this case, the position of the slider can indicate the amount of technical expertise the reader may need to have to understand the article. Thus, for example, if the slider is in the left most position, then the displayed content items are articles that do not require the reader to have technical expertise (e.g., articles written for the general public). Similarly, if the slider is in the right most position, then the displayed content items are articles that are targeted for readers with high levels of technical expertise (e.g., readers with graduate degrees).

Figure 10:
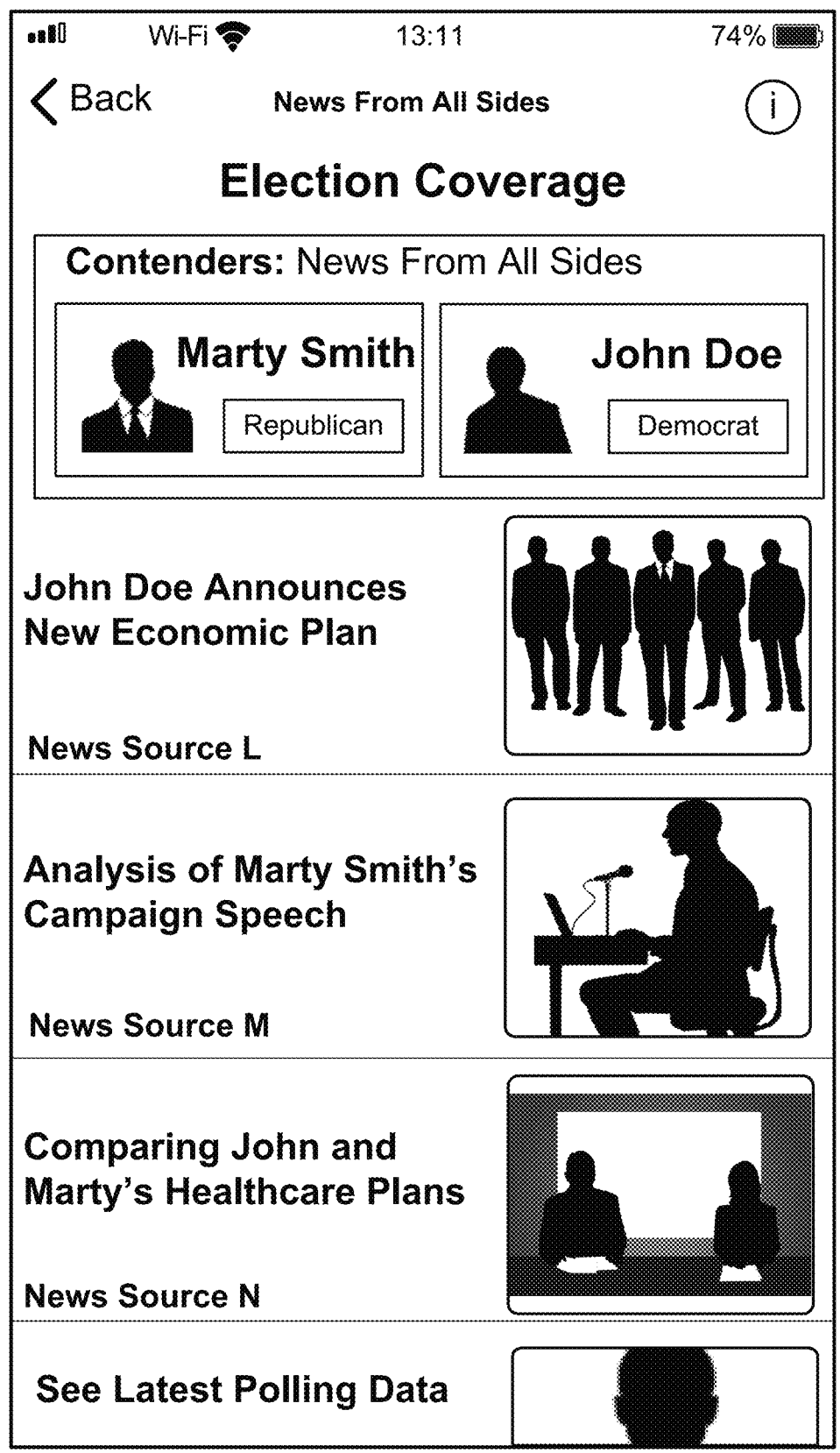
FIG. 10 is a user interface with a feed of content items related to a political election, according to an embodiment.
Figure 11:
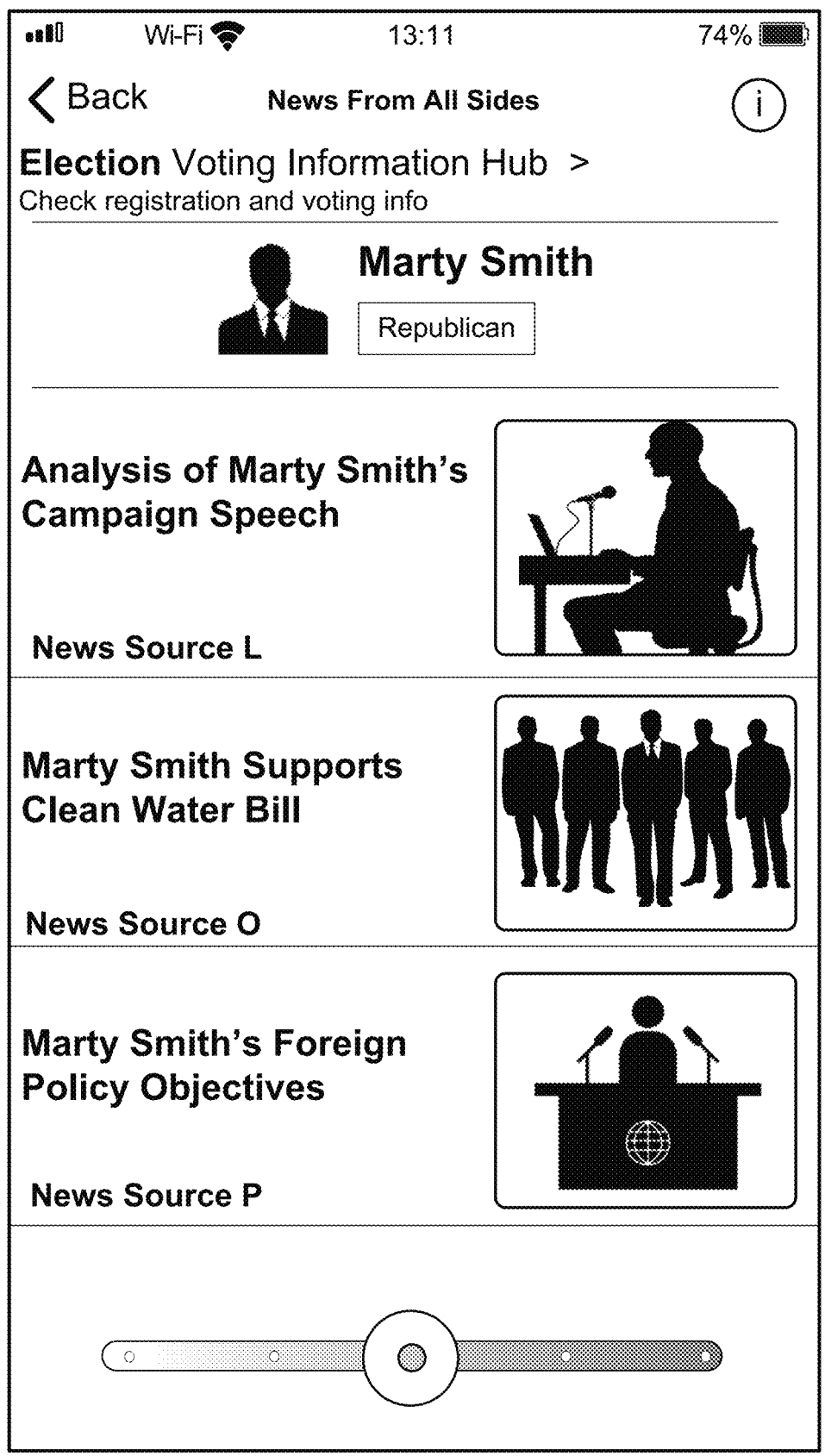
FIG. 11 is a user interface with a feed of content items related to a politician, according to an embodiment.

In another use case example, the content items are articles related to a political election or a politician. FIG. 10 is a user interface with a feed of content items related to a political election, according to an embodiment. Specifically, the user interface includes articles related to "Marty Smith" and "John Doe" who are candidates in a political election. This may allow a user to review articles covering both candidates. FIG. 11 is a user interface with a feed of content items related to a politician, according to an embodiment. Specifically, the user interface includes articles related to "Marty Smith." FIG. 11 also includes a slider and scale at the bottom of the user interface. Thus, for example, a user can view content items related to Marty Smith with different political perspectives or viewpoints by moving the slider. In another example, the user can view Marty Smith's views on political issues or topics by moving the slider. A user may access the user interface in FIG. 11 by interacting with the user interface in FIG. 10.

Figure 12:
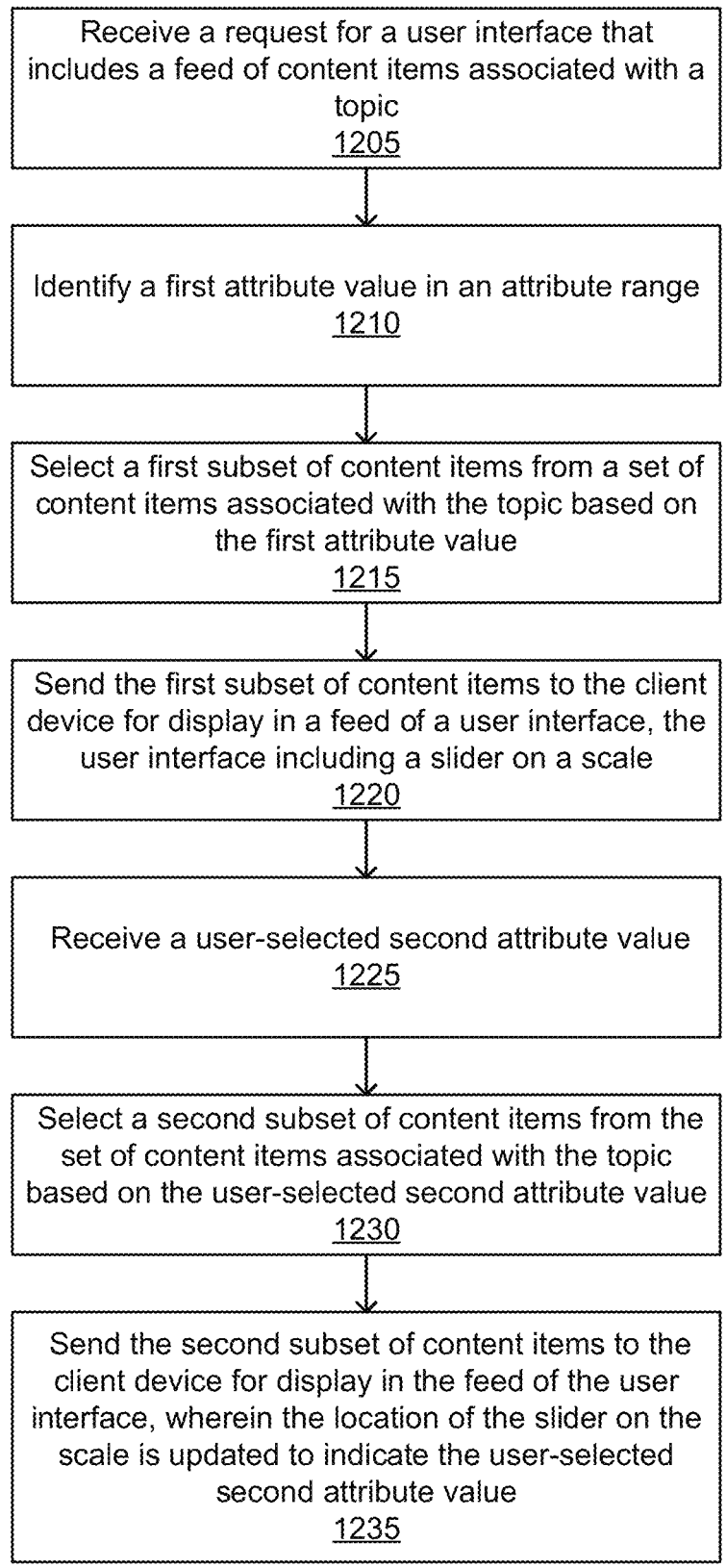
FIG. 12 is a flow chart illustrating a method for displaying a user interface with a slider and scale, according to one embodiment.

FIG. 12 is a flow chart illustrating a method for displaying a user interface with a slider and scale, according to one embodiment. The method may be performed from the perspective of the online system 140. The steps of the method may be performed in different orders, and the method may include different, additional, or fewer steps.

In step 1205, a request for a user interface that includes a feed of content items associated with a topic is received from a client device.

In step 1210, responsive to receiving the request, a first attribute value in a range of attribute values (also referred to as an attribute range) is identified. The first attribute value may be a default or predetermined value or may be selected by a user.

In step 1215, a first subset of content items from a set of content items associated with the topic is selected based on the first attribute value. Each content item in the first subset of content items has an attribute value in the range of attribute values.

In step 1220, the first subset of selected content items is sent to the client device for display in a feed of a user interface. The user interface includes a slider on a scale. The scale represents the range of attribute values. The location of the slider on the scale indicates the first attribute value. In some embodiments, the slider is a multidimensional slider and the location of the slider on the scale indicates two or more attribute values of content items displayed in the user interface. The scale may include one or more colors that indicate the range of attribute values represented by the scale.

In step 1225, a user-selected second attribute value is received from the client device. A user may select the user-selected second attribute value by interacting with the slider on the scale. The user-selected second attribute may be different than the first attribute value. In some embodiments, interacting with the slider on the scale includes the user changing the location of the slider on the scale.

In step 1230, responsive to receiving the user-selected second attribute value, a second subset of content items from the set of content items associated with the topic is selected based on the user-selected second attribute value. Each content item in the second subset of content items has an attribute value in the range of attribute values. In some embodiments, content items in the first subset are not in the second subset and vice versa. Said differently, the first subset and the second subset may be disjoint sets.

In step 1235, the second subset of selected content items is sent to the client device for display in the feed of the user interface. The location of the slider on the scale is updated to indicate the user-selected second attribute value. The second subset of content items may replace the first subset of content items displayed in the feed of the user interface.

In some embodiments, one or more content items from one or more content provider systems are received. A topic of each content item may be determined. Sets of content items based on the topics may be formed, where one of the sets may be the set of content items associated with the topic. It may be determined that the set of content items associated with the topic includes a threshold number of content items. One or more attribute values for content items in the set of content items may be determined. An attribute value for a content item may indicate a strength of an attribute exhibited by the content item. The first subset of content items and the second subset of content items may be formed from the content items in the set based on the attribute values of the content items.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving one or more content items from one or more content providers;
   determining a topic of each content item;
   forming sets of content items based on the topics;
   determining that a set of content items associated with a topic includes a threshold number of content items;
   responsive to determining that the set of content items includes the threshold number of content items, determining one or more viewpoints for content items in the set of content items, the viewpoints being in a range of viewpoints;
   responsive to determining the one or more viewpoints, forming a first subset of content items and a second subset of content items from the content items in the set based on the determined one or more viewpoints, each content item in the first subset being associated with a first viewpoint and each content item in the second subset being associated with a second viewpoint different than the first viewpoint;
   subsequent to forming the first and second subsets, receiving, from a client device, a request for a user interface that includes a feed of content items associated with the topic;
   selecting the first subset of content items from the set of content items associated with the topic based on the first viewpoint;
   sending the first subset of selected content items to the client device for display in a feed of a user interface, the user interface including a slider on a scale, wherein the scale represents a range of viewpoints and the slider is located at a first position representing the first viewpoint, the scale further including a second position representing the second viewpoint, the first and second positions being on opposite sides of the scale;

receiving, from the client device, a user-selection indicating the second viewpoint, wherein a user selects the second viewpoint by interacting with the slider on the scale;

responsive to receiving the user-selection indicating the second viewpoint, selecting the second subset of content items from the set of content items associated with the topic based on the second viewpoint; and sending the second subset of selected content items to the client device for display in the feed of the user interface, wherein the location of the slider on the scale is updated to the second position to indicate the second viewpoint.

2. The method of claim 1, wherein interacting with the slider on the scale comprises the user changing the location of the slider on the scale.

3. The method of claim 1, wherein the second subset of content items replace the first subset of content items displayed in the feed of the user interface.

4. The method of claim 1, wherein the first subset of content items and the second subset of content items are disjoint sets.

5. The method of claim 1, wherein the slider is a multi-dimensional slider and the location of the slider on the scale indicates two or more viewpoints of content items displayed in the user interface.

6. The method of claim 1, wherein a coloring of the scale indicates the range of viewpoints represented by the scale.

7. A non-transitory computer-readable storage medium storing executable computer program code that, when executed by one or more processors, cause the one or more processors to perform operations comprising:

receiving one or more content items from one or more content providers;

determining a topic of each content item;

forming sets of content items based on the topics;

determining that a set of content items associated with a topic includes a threshold number of content items;

responsive to determining that the set of content items includes the threshold number of content items, determining one or more viewpoints for content items in the set of content items, the viewpoints being in a range of viewpoints;

responsive to determining the one or more viewpoints, forming a first subset of content items and a second subset of content items from the content items in the set based on the determined one or more viewpoints, each content item in the first subset being associated with a first viewpoint and each content item in the second subset being associated with a second viewpoint different than the first viewpoint;

subsequent to forming the first and second subsets, receiving, from a client device, a request for a user interface that includes a feed of content items associated with the topic;

selecting the first subset of content items from the set of content items associated with the topic based on the first viewpoint;

sending the first subset of selected content items to the client device for display in a feed of a user interface, the user interface including a slider on a scale, wherein the scale represents a range of viewpoints and the slider is located at a first position representing the first viewpoint, the scale further including a second position representing the second viewpoint, the first and second positions being on opposite sides of the scale;

receiving, from the client device, a user-selection indicating the second viewpoint, wherein a user selects the second viewpoint by interacting with the slider on the scale;

responsive to receiving the user-selection indicating the second viewpoint, selecting the second subset of content items from the set of content items associated with the topic based on the second viewpoint; and sending the second subset of selected content items to the client device for display in the feed of the user interface, wherein the location of the slider on the scale is updated to the second position to indicate the second viewpoint.

8. The non-transitory computer-readable storage medium of claim 7, wherein interacting with the slider on the scale comprises the user changing the location of the slider on the scale.

9. The non-transitory computer-readable storage medium of claim 7, wherein the second subset of content items replace the first subset of content items displayed in the feed of the user interface.

10. The non-transitory computer-readable storage medium of claim 7, wherein the first subset of content items and the second subset of content items are disjoint sets.

11. A computer system comprising:

one or more processors; and a computer-readable storage medium comprising executable computer program code, the computer program code when executed causing the one or more processors to perform operations comprising:

receiving one or more content items from one or more content providers;

determining a topic of each content item;

forming sets of content items based on the topics;

determining that a set of content items associated with a topic includes a threshold number of content items;

responsive to determining that the set of content items includes the threshold number of content items, determining one or more viewpoints for content items in the set of content items, the viewpoints being in a range of viewpoints;

responsive to determining the one or more viewpoints, forming a first subset of content items and a second subset of content items from the content items in the set based on the determined one or more viewpoints, each content item in the first subset being associated with a first viewpoint and each content item in the second subset being associated with a second viewpoint different than the first viewpoint;

subsequent to forming the first and second subsets, receiving, from a client device, a request for a user interface that includes a feed of content items associated with the topic;

selecting the first subset of content items from the set of content items associated with the topic based on the first viewpoint;

sending the first subset of selected content items to the client device for display in a feed of a user interface, the user interface including a slider on a scale, wherein the scale represents a range of viewpoints and the slider is located at a first position representing the first viewpoint, the scale further including a second position representing the second viewpoint, the first and second positions being on opposite sides of the scale;

receiving, from the client device, a user-selection indicating the second viewpoint, wherein a user selects the second viewpoint by interacting with the slider on the scale;

responsive to receiving the user-selection indicating the second viewpoint, selecting the second subset of content items from the set of content items associated with the topic based on the second viewpoint; and sending the second subset of selected content items to the client device for display in the feed of the user interface, wherein the location of the slider on the scale is updated to the second position to indicate the second viewpoint.

12. The computer system of claim 11, wherein interacting with the slider on the scale comprises the user changing the location of the slider on the scale.

13. The computer system of claim 11, wherein the second subset of content items replace the first subset of content items displayed in the feed of the user interface.

14. The method of claim 1, wherein the first viewpoint and the second viewpoint are opposing viewpoints.

15. The method of claim 1, wherein the first viewpoint and the second viewpoint are political viewpoints.

16. The method of claim 15, wherein a distance from a center position of the scale to the location of the slider at the first position indicates a strength of the first political viewpoint relative to a centralist political viewpoint.

17. The method of claim 15, wherein the scale includes a blue region representing a liberal political viewpoint and a red region representing a conservative political viewpoint, the regions being on opposite sides of the scale.

18. The method of claim 1, wherein determining a viewpoint for a content item is based at least on a content provider system that provided the content item.

19. The method of claim 1, wherein determining a viewpoint for a content item is based at least on a creator of the content item.

20. The method of claim 1, wherein determining a viewpoint for a content item is based at least on phraseology of the content item.

21. The method of claim 1, wherein determining a viewpoint for a content item is based on at least one of: the topic or readability of the content item.

* * * * *